E. & J. M. CLARK.
Mill Bolt.
No. 6,335.
Patented April 17, 1849.
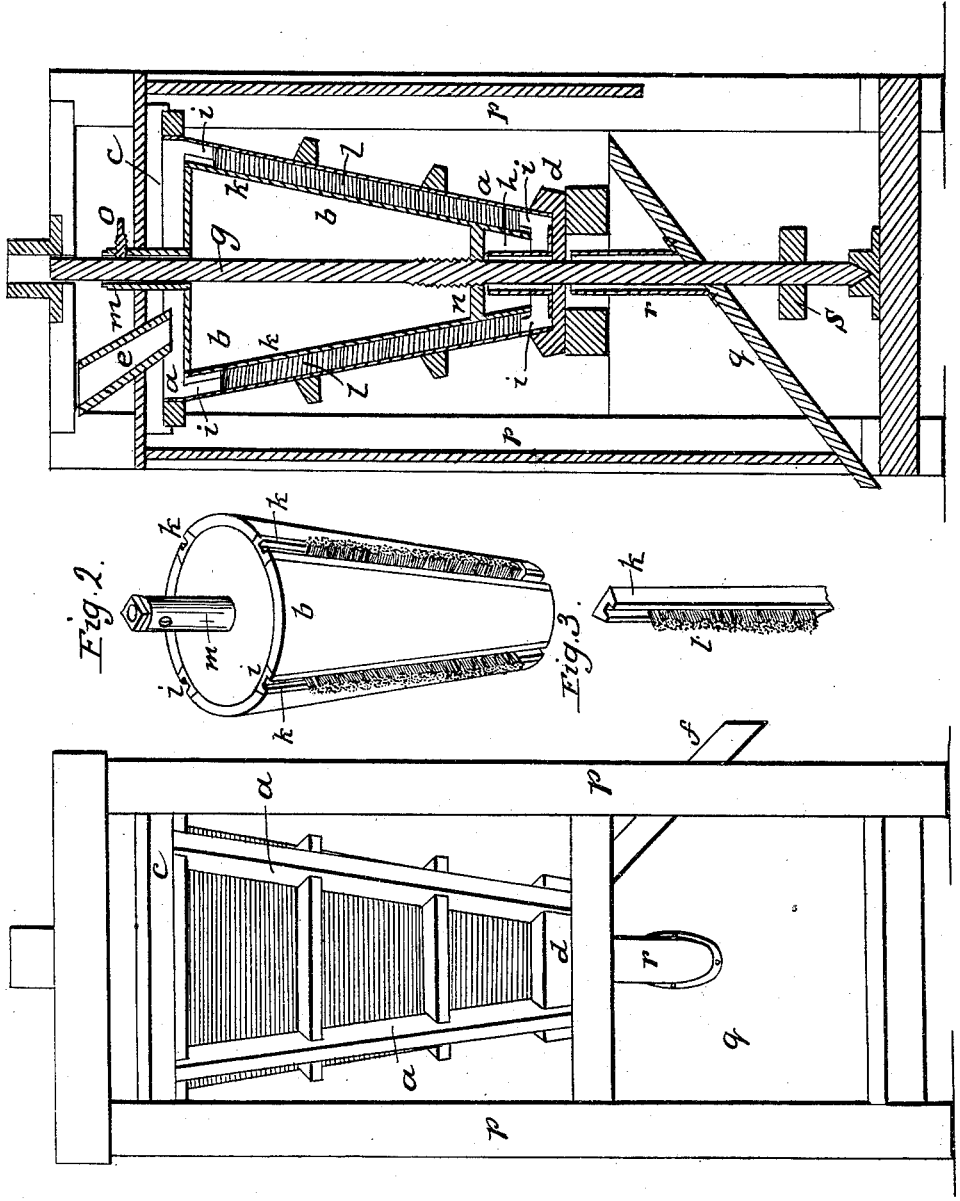

UNITED STATES PATENT OFFICE.

EDWIN CLARK AND J. M. CLARK, OF LANCASTER, PENNSYLVANIA.

MACHINERY FOR SEPARATING FLOUR FROM BRAN, &c.

Specification of Letters Patent No. 6,335, dated April 17, 1849.

*To all whom it may concern:*

Be it known that we, EDWIN CLARK and JAMES M. CLARK, of Lancaster, in the county of Lancaster and State of Pennsylvania, have invented certain new and useful Improvements in Machinery for Separating Flour from Bran, Ship Stuff, &c., and that the following is a full, clear, and exact description of the principle or character which distinguishes them from all other things before known and of the usual manner of making, modifying, and using the same, reference being had to the accompanying drawing, which forms a part thereof, in which—

Figure 1, is an elevation of the machine with the side of the inclosing box removed. Fig. 2, is the runner or brush cylinder detached. Fig. 3, a brush detached from the cylinder. Fig. 4, a section through the center of the concave.

It is found that aften grain has been ground ever so close, and bolted with the most perfect machinery, a large portion of the flour is left with the bran; to recover this is the object of our invention which requires a severe rubbing process.

The construction is as follows: We make the concave in form an inverted truncated cone $a$, composed of a proper frame work, to the inside of which a wire gauze of proper fineness is affixed; within which a similar formed runner $b$, is placed, but of a diameter sufficiently small to leave a space all around between them, enough to admit the feed and brushes hereafter described. The concave has a top $c$, and bottom $d$, of cast iron attached to it; the top has an opening into it for the purpose of admitting the feed into the concave through the spout $e$. The bottom has also an opening for the egress of the bran through a spout $f$; a hole is made through the center of the top and bottom for the shaft $g$, of the runner to pass through; a tube $h$, is attached to the hole in the bottom and extends up around the shaft to prevent the waste of the bran through it into the outer case where the flour falls.

The runner $b$, is a cast iron shell having dovetailed grooves $i$, in it extending from top to bottom in which wooden strips $k$, in which the bristles $l$, are inserted, are fitted; by this construction, this part of the runner which is most liable to wear can be readily renewed by simply removing the top of the concave. From the top of the runner a collar $m$, extends up through the concave and case, the upper end being made square so that the runner can be turned by it; at a proper distance above the lower end of the runner there is a nut $n$, affixed in its center high enough to clear the tube $h$, above named, the shaft $g$, passes up through the center of the runner and has a screw cut on that portion of it which passes through the nut extending a sufficient distance above and below said nut to allow the runner to be raised or lowered, without raising or lowering the shaft; the advantage of which is, that the connection between said shaft and the driving power cannot be deranged; a set screw $o$, in the collar $m$, serves to confine it to the shaft when it is properly elevated or depressed, by this contrivance the runner can be adjusted with the greatest accuracy so as to rub lighter or more forcibly as the work requires, and as the brushes wear. The concave is not affixed to the frame but can be moved to either side, being guided by the top and bottom center, so that if the cylinder wears unequal it can be adjusted by the brushes and then fastened by the set screws in the top of the case; the whole concave is inclosed by a case and frame work $p$, into which the flour is discharged from the gauze concave. The bottom $q$, of this case is inclined as represented, with an opening in front for the escape of the flour. A tube $r$, is attached to this inclined bottom, which incloses that portion of the shaft between it and the bottom of the concave. Below the bottom $q$, a pulley $s$, or bevel wheel is affixed to the shaft by which it is connected with the driving power.

Having thus fully described our improved machine for extracting flour from bran and after it has been bolted, what we claim therein as new and for which we desire to secure Letters Patent, is—

The combination of the runner, concave, and their adjustment one to the other substantially in the manner and for the purposes above made known.

EDWIN CLARK.
      JAMES M. CLARK.

Witnesses:
 WM. FRICK,
 EDWD. M. KAUFFMAN.